(12) United States Patent
Nakamura et al.

(10) Patent No.: US 9,115,859 B2
(45) Date of Patent: Aug. 25, 2015

(54) ARTIFICIAL SUNLIGHT RADIATION DEVICE

(75) Inventors: Atsushi Nakamura, Osaka (JP); Norito Fujihara, Osaka (JP); Kohji Minami, Osaka (JP); Masaru Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/349,403

(22) PCT Filed: Apr. 2, 2012

(86) PCT No.: PCT/JP2012/058795
§ 371 (c)(1),
(2), (4) Date: Apr. 3, 2014

(87) PCT Pub. No.: WO2013/065336
PCT Pub. Date: May 10, 2013

(65) Prior Publication Data
US 2014/0293571 A1    Oct. 2, 2014

(30) Foreign Application Priority Data

Oct. 31, 2011  (JP) .................. 2011-239817

(51) Int. Cl.
*F21V 9/02*  (2006.01)
*F21S 8/00*  (2006.01)
*G01R 31/40*  (2014.01)

(52) U.S. Cl.
CPC *F21S 8/006* (2013.01); *H02S 50/00* (2013.01)

(58) Field of Classification Search
CPC ..... F21S 8/006; G02B 6/0026; G02B 6/0028; G02B 6/0068; G02B 6/007

USPC .......................... 362/1–2, 608, 610
See application file for complete search history.

(56) References Cited

U.S. PATENT DOCUMENTS

| 2012/0033399 A1 | 2/2012 | Fujihara |
| 2012/0275132 A1 | 11/2012 | Minami et al. |
| 2012/0287600 A1 | 11/2012 | Iden et al. |

FOREIGN PATENT DOCUMENTS

| JP | 10-186311 A | 7/1998 |
| JP | 10-199319 A | 7/1998 |
| JP | 2002-48704 A | 2/2002 |
| JP | 3500352 B2 | 2/2004 |
| JP | 2004-103310 A | 4/2004 |
| JP | 4668348 B1 | 4/2011 |
| WO | 2010/146731 A1 | 12/2010 |
| WO | WO 2010143329 A1 * | 12/2010 |
| WO | 2011/121805 A1 | 10/2011 |

OTHER PUBLICATIONS

Official Communication issued in International Patent Application No. PCT/JP2012/058795, mailed on Jul. 3, 2012.

* cited by examiner

*Primary Examiner* — Jason Moon Han
(74) *Attorney, Agent, or Firm* — Keating & Bennett, LLP

(57) ABSTRACT

An artificial sunlight radiation device (10) includes a xenon light source (9), a condensing element (2), a tapered coupler (3), an optical filter (4), a light guide plate (16), a light extracting member (17), and a side-surface reflection member (15) that is provided at one or more side end surfaces of the light guide plate (16), reflects a portion of the light output from the light guide plate (16), and directs the portion of the light toward a radiation surface.

8 Claims, 10 Drawing Sheets

ARTIFICIAL SUNLIGHT RADIATION DEVICE

TECHNICAL FIELD

The present invention relates to artificial sunlight radiation devices that radiate artificial sunlight onto radiation surfaces.

BACKGROUND ART

The value of solar batteries as clean energy sources has been acknowledged, and the demands therefor are growing. Solar batteries can be used in a wide variety of fields, from power energy sources for large-scale devices to small-sized power sources for precision electronic devices. In order for solar batteries to be widely used in various fields, the properties of the batteries, especially the output characteristics thereof, need to be accurately measured. Otherwise, it is assumed that various problems may occur in the devices using the solar batteries. Therefore, a technology that can radiate high-precision artificial sunlight, which can be used for inspecting, measuring, and testing a solar battery, over a wide area is particularly in demand.

In recent years, artificial sunlight radiation devices are being developed as devices that can radiate artificial sunlight. Normally, such an artificial sunlight radiation device radiates artificial light (artificial sunlight) with uniform illuminance onto a light-receiving surface of a panel-shaped solar battery so as to be used for measuring, for example, the output characteristics of the solar battery.

The main element required in artificial sunlight is to make the emission spectrum thereof analogous to that of reference sunlight (established by Japanese Industrial Standard). However, in the artificial sunlight radiation device, since a light-source lamp is considered to be a spot or a line, it is extremely difficult to radiate light with uniform illuminance onto the entire light-receiving surface, which is planar, (or the entire area) of the solar battery. Patent Literature 1 discloses a technology in which the artificial sunlight radiation device is designed to adjust an illuminance variation therein.

Patent Literature 1 discloses an artificial sunlight radiation device in which halogen lamps and xenon lamps are installed in adjacent independent chambers. In detail, a dedicated optical filter is installed in an upper opening of each lamp, such that artificial sunlight is radiated onto the underside of the solar battery by turning on each lamp. Thus, by appropriately installing reflective plates inside the chambers in which the lamps are installed, an illuminance variation between the lamps can be adjusted.

CITATION LIST

Patent Literature

PTL 1: Japanese Unexamined Patent Application Publication No. 2002-48704

SUMMARY OF INVENTION

Technical Problem

However, in the technology disclosed in Patent Literature 1 described above, the uniformity of illuminance distribution of the artificial sunlight radiation device is insufficient. The reasons for this are as follows.

In the technology disclosed in Patent Literature 1, it is clear from FIG. 2 in Patent Literature 1 that the solar battery is disposed above two intermediate lamps of four xenon lamps (or halogen lamps) installed. In this case, at the upper portions of these xenon lamps (i.e., xenon lamps with other xenon lamps disposed adjacent to opposite sides thereof), the light intensity increases due to the effect of the quantity of light from the adjacent xenon lamps.

On the other hand, of the four xenon lamps, since the two xenon lamps disposed at the opposite ends (i.e., xenon lamps without other xenon lamps disposed adjacent to opposite sides thereof) each have only one lamp adjacent thereto at the upper portion thereof, the light intensity decreases as compared with the two intermediate xenon lamps.

Therefore, in the technology disclosed in Patent Literature 1, a so-called trapezoidal light intensity profile in which the light intensity at the upper portions of the two intermediate xenon lamps is high and uniform but the light intensity at the upper portions of the xenon lamps decreases toward the ends is exhibited. Consequently, it is disadvantageous in that when, for example, the output characteristics of the solar battery are to be measured at a location where the light intensity is uniform, only the upper portions of the two intermediate xenon lamps can be used.

Although Patent Literature 1 discloses the artificial sunlight radiation device of a double-light-source type constituted of halogen lamps and xenon lamps, in an artificial sunlight radiation device of a single-light-source type constituted only of xenon lamps or halogen lamps, a similar problem occurs also in a configuration in which multiple xenon lamps or multiple halogen lamps are arranged and attached in the longitudinal direction thereof.

Today, in addition to being installed at the rooftops of houses, solar batteries are also becoming installed in, for example, power-generating plants. In other words, as solar batteries are becoming used for various purposes, the area occupied by a solar battery is also increasing. In an artificial sunlight radiation device, it is preferable that a large-area solar battery (e.g., 1650 mm by 1000 mm) can be measured and that the measurement area thereof be increased as much as possible. In addition, it is necessary to achieve a uniform spectrum within the measurement area.

The present invention has been made to solve the aforementioned problems, and an object thereof is to provide an artificial sunlight radiation device with highly uniform illuminance and a large effective measurement region.

Solution to Problem

In order to solve the aforementioned problems, an artificial sunlight radiation device according to the present invention includes a light source; an optical member that gives directivity to output light from the light source; an optical filter that adjusts an emission spectrum of the output light given the directivity; a light guide plate that receives the output light whose emission spectrum has been adjusted; a light extracting member that is provided at the light guide plate and extracts the output light entering the light guide plate to a radiation surface; and a side-surface reflection member provided at one or more side end surfaces of the light guide plate.

In order to solve the aforementioned problems, an artificial sunlight radiation device according to the present invention includes a light source; an optical member that gives directivity to output light from the light source; an optical filter that adjusts an emission spectrum of the output light given the directivity; a light guide plate that receives the output light whose emission spectrum has been adjusted; a light extracting member that is provided at the light guide plate and extracts the output light entering the light guide plate to a radiation surface; and a side-surface reflection member that is provided at one or more side end surfaces of the light guide plate, reflects a portion of the light output from the light guide plate, and directs the portion of the light toward the radiation surface.

According to the above-described configuration, the side-surface reflection member is provided at the side end surface of the light guide plate so that the light that is output outward of a radiation region (measurement region) from the end (side end surface) of the light guide plate and is to become a loss is reflected by the side-surface reflection member, returns to the light guide plate, and is directed upward toward the radiation surface. As a result, the intensity of the light directed upward toward the radiation surface from the end of the light guide plate can be increased to about the same level as the intensity of the light directed upward toward the radiation surface from an intermediate section of the light guide plate. Consequently, as compared with a case where the light guide plate is not provided with the side-surface reflection member, the measurement region where uniform light intensity can be stably obtained can be expanded. Moreover, uniform illuminance can be achieved with the simple structure of the side-surface reflection member.

Furthermore, in order to solve the aforementioned problems, an artificial sunlight radiation device according to the present invention includes a first light source that radiates first light; a first optical member that gives directivity to the first light; a first optical filter that adjusts an emission spectrum of the first light given the directivity; a second light source that radiates second light that is different from the first light; a second optical member that gives directivity to the second light; a second optical filter that adjusts an emission spectrum of the second light given the directivity; a wavelength selecting member that selects light with a shorter wavelength than a predetermined boundary wavelength from the first light whose emission spectrum has been adjusted, selects light with a longer wavelength than the predetermined boundary wavelength from the second light whose emission spectrum has been adjusted, and outputs the selected first light and the selected second light; a light guide plate that receives the first light and the second light selected by the wavelength selecting member; light extracting means that is provided at the light guide plate and extracts the first light and the second light entering the light guide plate to a radiation surface; and a side-surface reflection member provided at one or more side end surfaces of the light guide plate.

Furthermore, in order to solve the aforementioned problems, an artificial sunlight radiation device according to the present invention includes a first light source that radiates first light; a first optical member that gives directivity to the first light; a first optical filter that adjusts an emission spectrum of the first light given the directivity; a second light source that radiates second light that is different from the first light; a second optical member that gives directivity to the second light; a second optical filter that adjusts an emission spectrum of the second light given the directivity; a wavelength selecting member that selects light with a shorter wavelength than a predetermined boundary wavelength from the first light whose emission spectrum has been adjusted, selects light with a longer wavelength than the predetermined boundary wavelength from the second light whose emission spectrum has been adjusted, and outputs the selected first light and the selected second light; a light guide plate that receives the first light and the second light selected by the wavelength selecting member; light extracting means that is provided at the light guide plate and extracts the first light and the second light entering the light guide plate to a radiation surface; and a side-surface reflection member that is provided at one or more side end surfaces of the light guide plate, reflects a portion of the light output from the light guide plate, and directs the portion of the light toward the radiation surface.

According to the above-described configuration, a measurement region where uniform light intensity can be stably obtained can be expanded, as compared with a case where the light guide plate is not provided with the side-surface reflection member. Moreover, uniform illuminance can be achieved with the simple structure of the side-surface reflection member. In addition, with the first light source and the second light source, a larger quantity of (brighter) artificial sunlight can be output from the radiation surface.

Other objects, characteristics, and outstanding features of the present invention will become sufficiently apparent from the following description. Furthermore, the advantages of the present invention will become clear from the following description with reference to the appended drawings.

Advantageous Effects of Invention

With the artificial sunlight radiation device according to the present invention, the measurement region where uniform light intensity can be stably obtained can be expanded, as compared with a case where the light guide plate is not provided with the side-surface reflection member. Moreover, uniform illuminance can be achieved with the simple structure of the side-surface reflection member.

DESCRIPTION OF EMBODIMENTS

[First Embodiment]
[Configuration of Artificial Sunlight Radiation Device 10]

Figure 1:
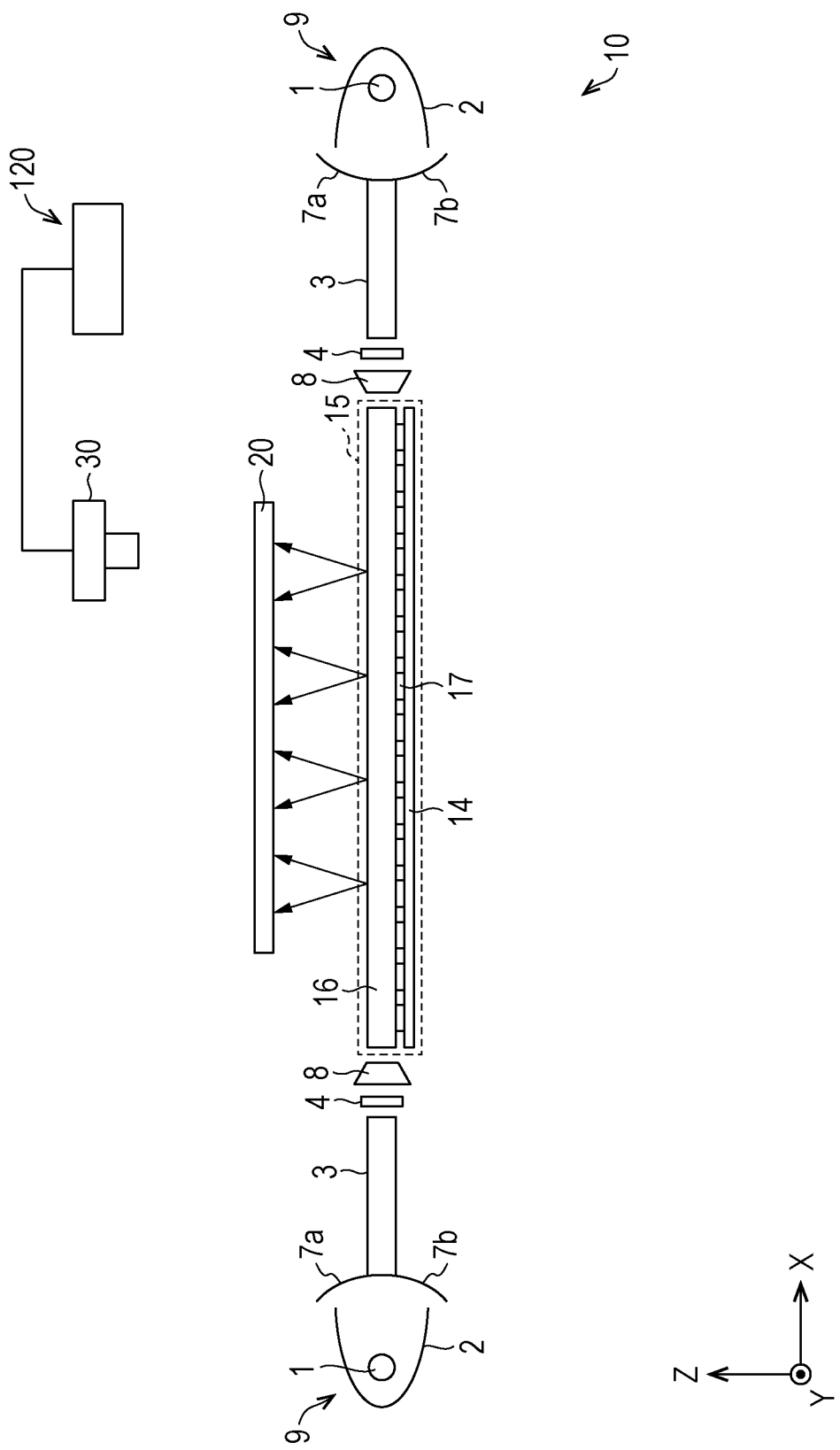
FIG. 1 illustrates a relevant configuration of an artificial sunlight radiation device according to an embodiment of the present invention.

An embodiment according to the present invention will now be described with reference to the drawings. First, an artificial sunlight radiation device 10 that radiates artificial sunlight will be described in detail with reference to FIG. 1. FIG. 1 illustrates a relevant configuration of the artificial sunlight radiation device 10. Artificial sunlight is a kind of artificial light and has an emission spectrum that is very analogous to an emission spectrum of natural light (sunlight). The artificial sunlight radiation device 10 according to this embodiment radiates xenon light as artificial sunlight onto an irradiated member, such as a solar battery 20, so as to measure the properties of the solar battery 20. When performing an actual measurement process, the solar battery 20 is connected to a measurement terminal 30, and a detection signal thereof is transmitted to a measurement unit 120.

As shown in FIG. 1, the artificial sunlight radiation device 10 includes optical coupling members 8, xenon light sources 9 (first light source), a reflection member 14, side-surface reflection members 15, a light guide plate 16, and a light extracting member 17. The artificial sunlight radiation device 10 outputs artificial sunlight (denoted by arrows in the drawing) from a radiation surface (upper surface) of the light guide plate 16 toward the solar battery 20. The artificial sunlight radiation device 10 will be described in detail below. In the following description, the radiation side of the light guide plate 16 will be defined as an upper side, whereas an opposite side (back side) from the radiation side will be defined as a lower side.

Opposite side surfaces (side end surfaces) of the light guide plate 16 are individually provided with the xenon light sources 9. The light guide plate 16 radiates, from the radiation surface (upper surface) of the light guide plate 16, artificial sunlight radiated toward the opposite side surfaces of the light guide plate 16 from the xenon light sources 9. In the artificial sunlight radiation device 10 according to this embodiment, two side surfaces of the light guide plate 16 that are not provided with the xenon light sources 9 are provided with the side-surface reflection members 15. If light guided internally through the light guide plate 16 leaks from the side surfaces of the light guide plate 16 that are not provided with the xenon light sources 9, the light can be reflected toward the solar battery 20 by the side-surface reflection members 15. It is preferable that the side-surface reflection members 15 be formed of plate-like members for preventing an increase in size of the device as well as an increase in costs of the components. With the side-surface reflection members 15 being formed of plate-like members, metal plates of, for example, aluminum, with which high reflectivity can be obtained with a wavelength ranging between 350 nm and 1100 nm can be used, or resin plates plated with thin metallic films can be used. Alternatively, the side-surface reflection members 15 may each have a simple configuration. For example, each side-surface reflection member 15 may be formed of a resin plate on which, for example, protrusions and recesses that exhibit a reflecting function are printed or molded. As another alternative, each side-surface reflection member 15 may be formed of a reflective material, such as an aluminum foil, bonded to the inside of a housing in which the artificial sunlight radiation device 10 is stored. As a further alternative, each side-surface reflection member 15 may be formed by applying a reflective material, such as a metal-containing coating, to the inside of the housing.

The light extracting member 17 is formed at the lower surface of the light guide plate 16. The light extracting member 17 extracts the artificial sunlight output from the xenon light sources 9 to the radiation surface of the light guide plate 16. In detail, the light (artificial sunlight) entering the light guide plate 16 from the xenon light sources 9 propagates internally through the light guide plate 16. In this case, the light hitting the light extracting member 17 is output toward the radiation surface of the light guide plate 16. Thus, the artificial sunlight can be radiated uniformly from a wider area of the radiation surface. The light extracting member 17 may be, for example, a scattering member formed by printing or using a die. The scattering member can scatter the artificial sunlight within the light guide plate 16 and guide the artificial sunlight toward the radiation surface. Furthermore, the pattern of the scattering member, that is, the shape of dots, the size thereof, the pitch thereof, the distance therebetween, or so forth, is appropriately set in view of the size of the solar battery 20 so that the artificial sunlight is radiated uniformly onto the entire area of the solar battery 20.

The reflection member 14 is disposed further below the light extracting member 17. If the light guided internally through the light guide plate 16 leaks downward from the light guide plate 16, the light can be reflected toward the solar battery 20 by the reflection member 14. The reflection member 14 may be, for example, a reflective mirror formed of metal, such as aluminum, or a resin member having a reflective pattern formed by, for example, printing or using a die.

The xenon light sources 9 are disposed at the opposite side surfaces of the light guide plate 16 and output artificial sunlight toward the opposite ends of the light guide plate 16. Thus, a larger quantity of (brighter) artificial sunlight can be output from the radiation surface. However, the xenon light sources 9 do not necessarily need to be provided at the opposite ends of the light guide plate 16, and may alternatively be provided at only one end of the light guide plate 16.

[Configuration of Xenon Light Sources 9]

Figure 2:
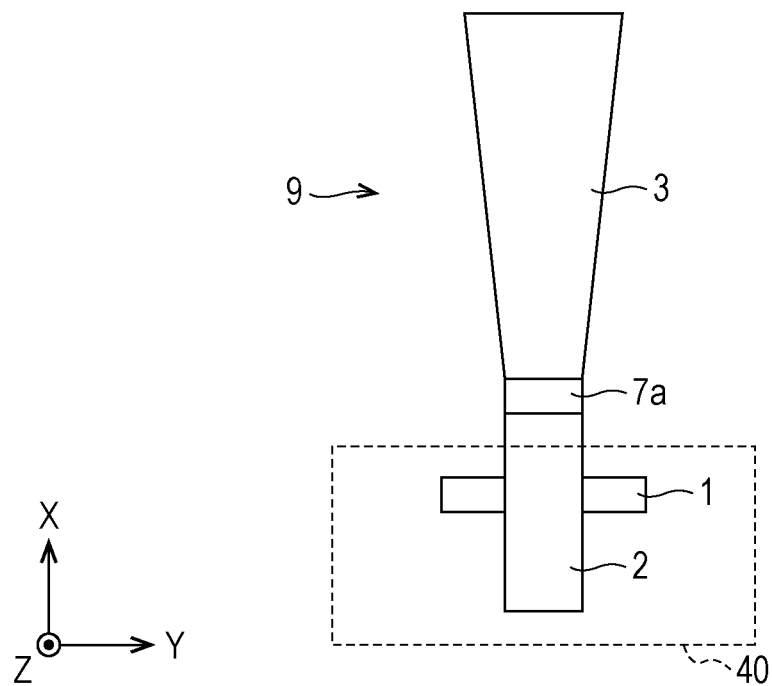
FIG. 2 illustrates a xenon light source according to the embodiment of the present invention, as viewed from a radiation surface (upper surface) of a light guide plate.

A detailed configuration of each xenon light source 9 will be described below with reference to FIG. 2. FIG. 2 illustrates the xenon light source 9, as viewed from the radiation surface (upper surface) of the light guide plate 16. As shown in FIG. 2, the xenon light source 9 is constituted of a xenon lamp 1, a condensing element 2 (optical member), a tapered coupler 3 (optical member), reflective plates 7a and 7b, and an optical filter 4.

The xenon lamp 1 preferably has a tubular shape for causing light to efficiently enter the light guide plate 16. With the xenon lamp 1 having a tubular shape, since the xenon lamp has a circular cross-sectional shape in an XZ plane, as shown in FIG. 1, the light output from the xenon lamp 1 is output in all directions within the XZ plane. In order to cause the light output from the xenon lamp 1 to efficiently enter the light guide plate 16, the xenon lamp 1 is surrounded by the condensing element 2 except for the output direction toward the tapered coupler 3. Thus, of the light output from the xenon lamp 1, a light beam not traveling toward the tapered coupler 3 is reflected by the condensing element 2 so as to be output toward the tapered coupler 3. In other words, the condensing element 2 condenses and outputs the light output from the xenon lamp 1. The condensing element 2 is, for example, an ellipsoidal mirror or a parabolic mirror and aligns the radiation directivity of the light output from the xenon lamp 1. As a result, the light output directly from the xenon lamp 1 and the light reflected by the condensing element 2 are output toward the tapered coupler 3. Consequently, the output light from the xenon lamp 1 is utilized effectively.

The tapered coupler 3 is an optical element provided in the xenon light source 9. The tapered coupler 3 is provided between the xenon lamp 1 and the optical filter 4. One end of the tapered coupler 3 is disposed adjacent to the xenon lamp 1, whereas the other end is disposed adjacent to the optical filter 4. As shown in FIG. 2, the tapered coupler 3 has a pair of tapered surfaces facing each other when viewed from a Z direction. Specifically, the cross-sectional area of the tapered coupler 3 gradually increases from the entrance surface to the exit surface of the tapered coupler 3. With this structure, the light output from the xenon lamp 1 is repeatedly reflected by the side surfaces of the tapered coupler 3, so that the directivity is improved. Thus, light with aligned directivity in a direction (X direction) substantially vertical to the exit surface of the tapered coupler 3 is output from the exit surface of the tapered coupler 3. A dotted line denotes a lamp cover 40.

In order to make the spectrum distribution of the artificial sunlight analogous to the spectrum distribution of reference sunlight, the xenon light source 9 is equipped with the optical filter 4. The optical filter 4 is an optical element that adjusts the spectrum distribution (controls the transmittance) of the light output from the xenon lamp 1 (tapered coupler 3). The optical filter 4 is normally called an air mass filter (spectrum adjustment filter). The optical filter 4 is provided adjacent to the exit surface of the tapered coupler 3 corresponding to the xenon lamp 1. The optical filter 4 adjusts the spectrum distribution of xenon light output from the tapered coupler 3. Thus, of the xenon light output from the tapered coupler 3, a wavelength component that is not necessary for generating artificial sunlight can be removed. The light that has undergone spectrum adjustment by the optical filter 4 travels through the optical coupling member 8 so as to enter the light guide plate 16.

Although the light guide plate 16 is formed of a material with high transmittance, such as quartz, it is preferable that, for example, quartz glass that is as thin as possible be used since it is expensive. Thus, each optical coupling member 8 is preferably configured to reduce the width of the light passing through the tapered coupler 3 to the thickness of the thin light guide plate 16.

[Radiation of Artificial Sunlight]

Figure 3:
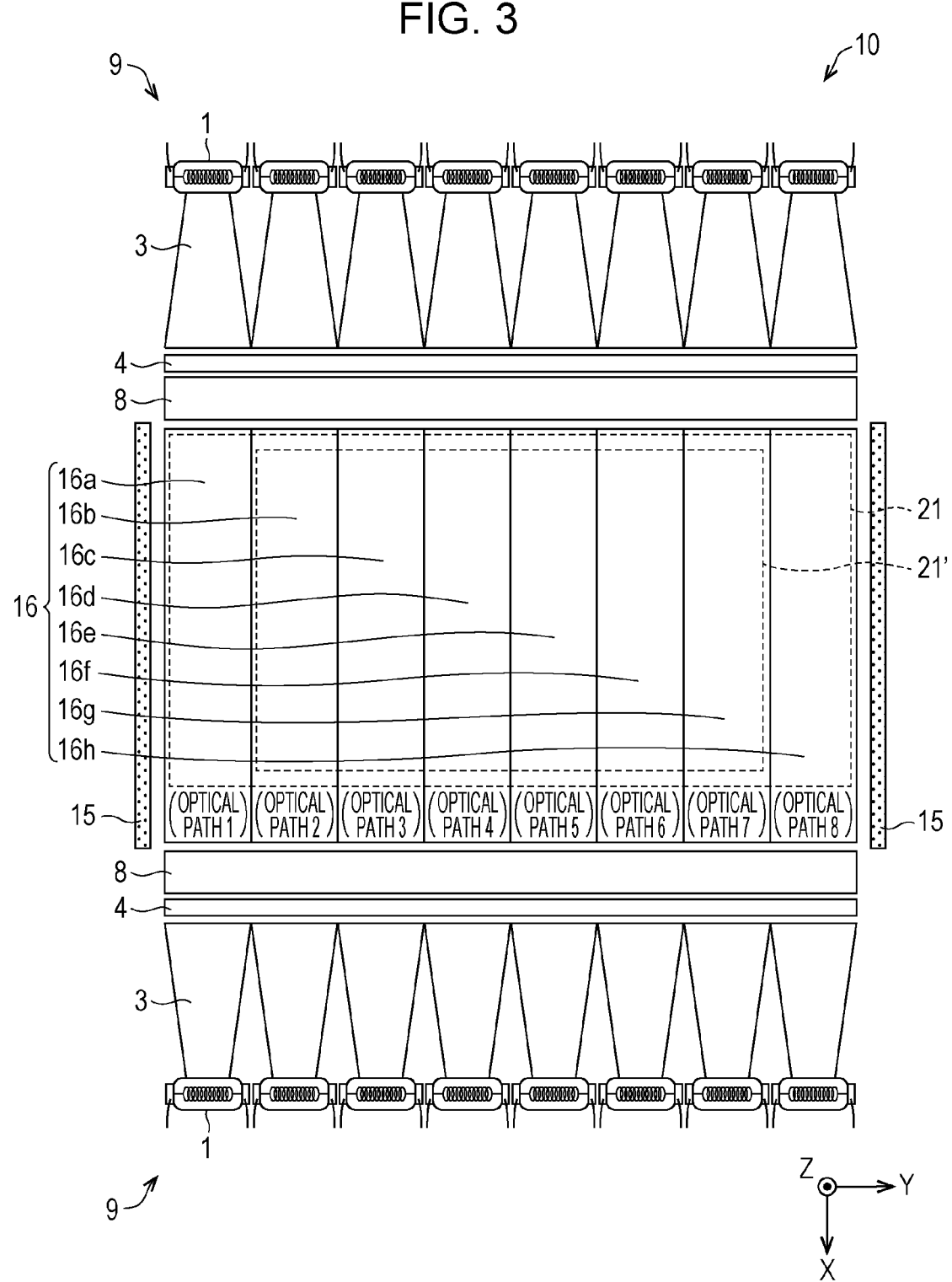
FIG. 3 is a top view illustrating a relevant configuration of the artificial sunlight radiation device according to the embodiment.

The radiation of artificial sunlight in the artificial sunlight radiation device 10 according to this embodiment will be described in further detail. FIG. 3 is a top view illustrating a relevant configuration of the artificial sunlight radiation device 10.

As shown in FIG. 3, since it is difficult to manufacture a long xenon lamp 1 at low cost, it is preferable that multiple xenon lamps 1 be arranged in the artificial sunlight radiation device 10. In this case, the light guide plate 16 is divided into multiple (eight in FIG. 3) light guide members 16a to 16h in accordance with the number of xenon lamps 1. In other words, multiple (eight in FIG. 3) xenon light sources 9 are provided in correspondence with the light guide members 16a to 16h.

In the artificial sunlight radiation device 10, the light guide plate 16 is divided into multiple light guide members 16a to 16h so that the total quantity of input light can be increased for all of the light guide members 16a to 16h. Furthermore, arranging multiple small-sized light guide members rather than forming the light guide plate 16 with a single plate is advantageous in terms of cost for obtaining the light guide plate 16 of a desired size.

As described above, in FIG. 3, the light guide plate 16 is constituted of eight light guide members 16a to 16h arranged in a Y direction. The light guide members 16a to 16h receive light from the corresponding xenon light sources 9 via the tapered couplers 3, the optical filters 4, and the optical coupling members 8. For a subsequent description, optical paths within the light guide members 16a to 16h will be defined as optical paths 1 to 8, respectively.

The light guide members 16b to 16g are located at the intermediate section of the eight arranged light guide members and each have other light guide members disposed adjacent to opposite sides thereof. In other words, the optical paths 2 to 7 each have other optical paths disposed adjacent to opposite sides thereof, whereas each of the optical path 1 and the optical path 8 does not have other optical paths disposed adjacent to opposite sides thereof. With regard to the optical path 1, only the optical path 2 is disposed at the Y-direction side (right side in the drawing) thereof. With regard to the optical path 8, only the optical path 7 is disposed at the opposite side (left side in the drawing) of the Y-direction side thereof.

Light entering each of the light guide members 16b to 16g passes through the optical path thereof and a portion of the light enters the adjacent light guide members. In other words, a portion of the light entering each of the light guide members 16b to 16g is guided in the longitudinal direction (X direction) of the light guide member while being mixed in the adjacent optical paths, and is directed upward toward the solar battery 20 disposed at the Z-direction side (radiation side of the artificial sunlight radiation device 10).

On the other hand, light entering the light guide member 16a passes through the optical path 1 and is directed upward from the light guide member 16a toward the solar battery 20 disposed at the Z-direction side (radiation side of the artificial sunlight radiation device 10) while being guided in the longitudinal direction (X direction) of the light guide member 16a. In addition, the light is mixed in the optical path 2 of the adjacent light guide member 16b so as to be directed upward also from the light guide member 16b. Likewise, with regard to the light guide member 16h, light entering the light guide member 16h passes through the optical path 8 and is directed upward from the light guide member 16h toward the solar battery 20 disposed at the Z-direction side (radiation side of the artificial sunlight radiation device 10) while being guided in the longitudinal direction (X direction) of the light guide member 16h. In addition, the light is mixed in the optical path 7 of the adjacent light guide member 16g so as to be directed upward also from the light guide member 16g.

Normally, a portion of the light entering the light guide member 16a is output toward the opposite side (left side in the drawing) of the Y-direction side of the light guide member 16a. Such light is output outward of a measurement region (region where the solar battery 20 is disposed) and cannot be utilized as measurement light, thus becoming a loss in terms of light utilization efficiency. Likewise, with regard to the light guide member 16h, a portion of the light entering the light guide member 16h is output toward the Y-direction side (right side in the drawing) of the light guide member 16h. Such light is output outward of the measurement region (region where the solar battery 20 is disposed) and cannot be utilized as measurement light, thus becoming a loss in terms of light utilization efficiency.

In particular, in a configuration in which multiple arranged light guide members 16a to 16h are used in place of a single relatively-wide light guide member, light is radiated independently from each light guide member. Therefore, a brightness variation is noticeable due to reduced radiation brightness at the light guide member 16*a* and the light guide member 16*h* that are disposed at the ends. In a case where a single light guide member is disposed, light propagates internally through the light guide member and is output outward therefrom. Therefore, the radiation light tends to be uniform. In contrast, in a case where multiple light guide members are disposed, since there are interfaces between adjacent light guide members, the propagation of light between adjacent light guide members is low, thus causing a difference in brightness of light radiated from the light guide member 16*b* and the light guide member 16*g* respectively adjacent to the light guide member 16*a* and the light guide member 16*h* disposed at the ends.

However, in this embodiment, the side-surface reflection members 15 are provided at the two side surfaces of the light guide plate 16 that are not provided with the xenon light sources 9. Specifically, the side-surface reflection members 15 are provided at the opposite side (left side in the drawing) of the Y-direction side of the optical path 1 of the light guide member 16*a* and at the Y-direction side (right side in the drawing) of the optical path 8 of the light guide member 16*h*. The aforementioned light that is output outward of the measurement region from the optical path 1 of the light guide member 16*a* and the optical path 8 of the light guide member 16*h* and is to become a loss is reflected by the side-surface reflection members 15, returns to the optical path 1 and the optical path 8, and is directed upward toward the Z-direction side (radiation side of the artificial sunlight radiation device 20) from the optical path 1 and the optical path 8. As a result, the intensity of the light directed upward toward the Z-direction side (radiation side of the artificial sunlight radiation device 20) from each of the optical path 1 of the light guide member 16*a* and the optical path 8 of the light guide member 16*h* can be increased to about the same level as the intensity of the light directed upward toward the Z-direction side (radiation side of the artificial sunlight radiation device 20) from each of the optical paths 2 to 7 of the light guide members 16*b* to 16*g*. Consequently, in contrast to the measurement region (region where the solar battery 20 is disposed) where uniform light intensity can be stably obtained being a dotted-line section 21' shown in the drawing in a case where the light guide plate 16 is not provided with the side-surface reflection members 15, the measurement region where such uniform light intensity can be stably obtained can be expanded to a dotted-line section 21 shown in the drawing. Moreover, uniform illuminance can be achieved with the simple structure of the side-surface reflection members 15.

The position and the height (height in the thickness direction of the light guide plate 16) of the side-surface reflection members 15 are adjustable by using a side-surface-reflection-member adjusting mechanism (not shown), such that the position and the height may be variably adjusted to increase or finely adjust an effective measurement region. Furthermore, in the configuration in which multiple light guide members are arranged as in this embodiment, illuminance adjustment of each light guide member can be performed independently, which is ultimately advantageous in that the illuminance of the entire radiation surface is adjustable. In the configuration in which multiple light guide members are arranged, since an optical loss occurs multiple times as the light passes through the interfaces between adjacent light guide members, the quantity of radiation light at the entire radiation surface slightly decreases. In particular, a decrease in the quantity of radiation light in the optical paths of the light guide members disposed at the ends is of concern. However, since the side-surface reflection members 15 are disposed along the opposite end surfaces of the light guide plate 16 in this embodiment, a decrease in illuminance in the optical paths of the light guide members at the opposite ends can be suppressed, whereby uniform illuminance can be achieved.

[Second Embodiment]
[Configuration of Artificial Sunlight Radiation Device 100]

Figure 4:
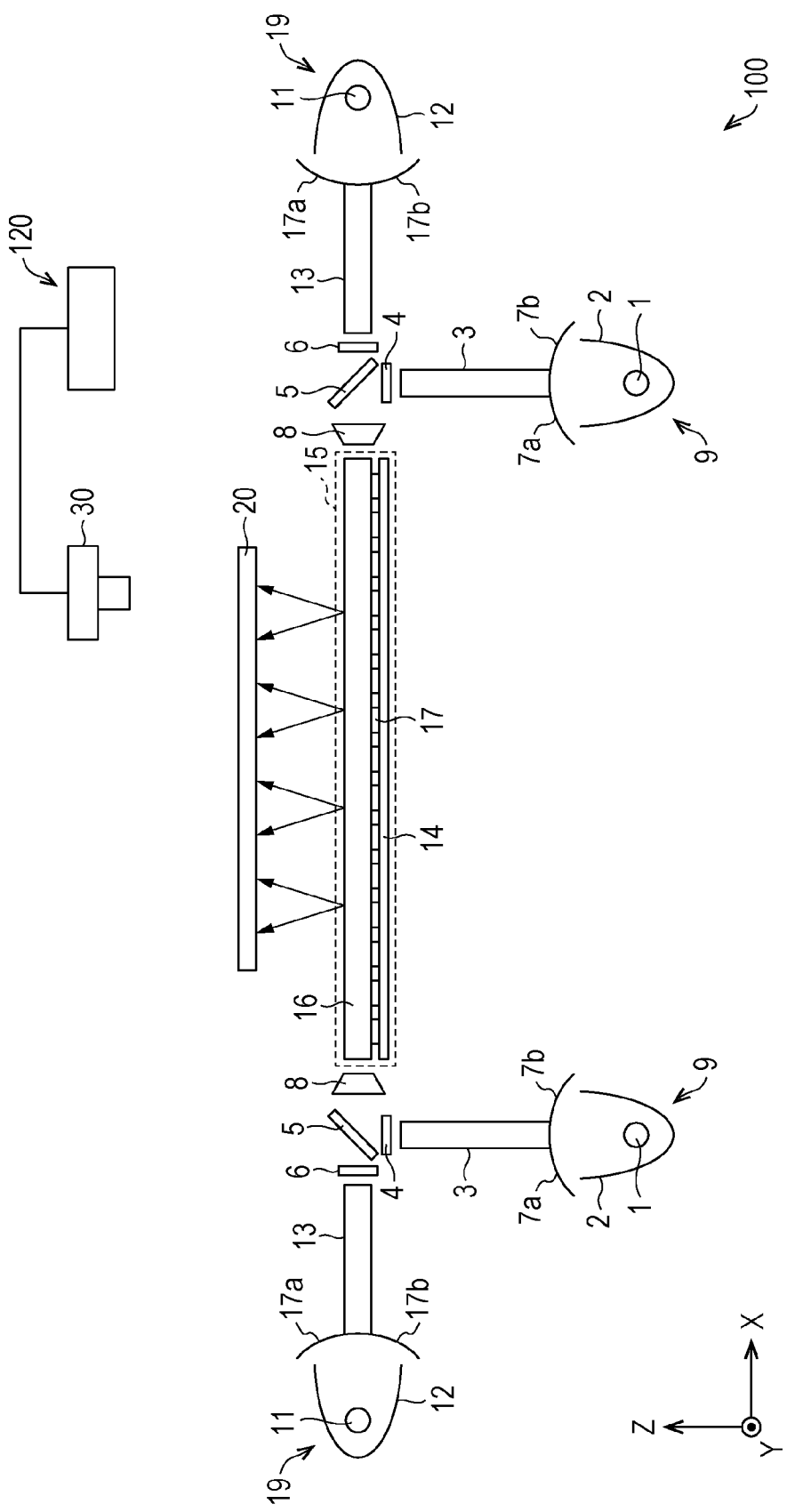
FIG. 4 illustrates a relevant configuration of an artificial sunlight radiation device according to another embodiment of the present invention.

An embodiment according to the present invention will be described with reference to the drawings. First, an artificial sunlight radiation device 100 that radiates artificial sunlight will be described with reference to FIG. 4. FIG. 4 illustrates a relevant configuration of the artificial sunlight radiation device 100. Artificial sunlight is a kind of artificial light and has an emission spectrum that is very analogous to an emission spectrum of natural light (sunlight). The artificial sunlight radiation device 100 according to this embodiment radiates combined light, which is obtained by combining xenon light (second light) and halogen light (first light), as artificial sunlight onto an irradiated member, such as a solar battery 20. When performing an actual measurement process, the solar battery 20 is connected to a measurement terminal 30, and a detection signal thereof is transmitted to a measurement unit 120.

As shown in FIG. 4, the artificial sunlight radiation device 100 includes wavelength selecting members 5, optical coupling members 8, xenon light sources 9 (second light source), halogen light sources 19 (first light source), a reflection member 14, side-surface reflection members 15, a light guide plate 16, and a light extracting member 17. The artificial sunlight radiation device 100 outputs artificial sunlight (denoted by arrows in the drawing) from a radiation surface (upper surface) of the light guide plate 16 toward the solar battery 20. The artificial sunlight radiation device 10 will be described in detail below. In the following description, the radiation side of the light guide plate 16 will be defined as an upper side, whereas an opposite side (back side) from the radiation side will be defined as a lower side.

Opposite side surfaces (side end surfaces) of the light guide plate 16 are individually provided with the xenon light sources 9 and the halogen light sources 19. The light guide plate 16 radiates, from the radiation surface (upper surface) of the light guide plate 16, artificial sunlight radiated toward the opposite side surfaces of the light guide plate 16 from the xenon light sources 9 and the halogen light sources 19. In the artificial sunlight radiation device 100 according to this embodiment, two side surfaces of the light guide plate 16 that are not provided with the xenon light sources 9 and the halogen light sources 19 are provided with the side-surface reflection members 15. If light guided internally through the light guide plate 16 leaks from the side surfaces of the light guide plate 16 that are not provided with the xenon light sources 9 and the halogen light sources 19, the light can be reflected toward the solar battery 20 by the side-surface reflection members 15. It is preferable that the side-surface reflection members 15 be formed of plate-like members for preventing an increase in size of the device as well as an increase in costs of the components. With the side-surface reflection members 15 being formed of plate-like members, metal plates of, for example, aluminum, with which high reflectivity can be obtained with a wavelength ranging between 350 nm and 1100 nm can be used, or resin plates plated with thin metallic films can be used. Alternatively, the side-surface reflection members 15 may each have a simple configuration. For example, each side-surface reflection member 15 may be formed of a resin plate on which, for example, protrusions and recesses that exhibit a reflecting function are printed or molded. As another alternative, each side-surface reflection member 15 may be formed of a reflective material, such as an aluminum foil, bonded to the inside of a housing in which the artificial sunlight radiation device 10 is stored. As a further alternative, each side-surface reflection member 15 may be formed by applying a reflective material, such as a metal-containing coating, to the inside of the housing.

The light extracting member 17 is formed at the lower surface of the light guide plate 16. The light extracting member 17 extracts the artificial sunlight output from the xenon light sources 9 and the halogen light sources 19 to the radiation surface of the light guide plate 16. In detail, the light (artificial sunlight) entering the light guide plate 16 from the xenon light sources 9 and the halogen light sources 19 propagates internally through the light guide plate 16. In this case, the light hitting the light extracting member 17 is output toward the radiation surface of the light guide plate 16. Thus, the artificial sunlight can be radiated uniformly from a wider area of the radiation surface. The light extracting member 17 may be, for example, a scattering member formed by printing or using a die. The scattering member can scatter the artificial sunlight within the light guide plate 16 and guide the artificial sunlight toward the radiation surface. Furthermore, the pattern of the scattering member, that is, the shape of dots, the size thereof, the pitch thereof, the distance therebetween, or so forth, is appropriately set in view of the size of the solar battery 20 so that the artificial sunlight is radiated uniformly onto the entire area of the solar battery 20.

The reflection member 14 is disposed further below the light extracting member 17. If the light guided internally through the light guide plate 16 leaks downward from the light guide plate 16, the light can be reflected toward the solar battery 20 by the reflection member 14. The reflection member 14 may be, for example, a reflective mirror formed of metal, such as aluminum, or a resin member having a reflective pattern formed by, for example, printing or using a die.

The xenon light sources 9 and the halogen light sources 19 are disposed at the opposite side surfaces of the light guide plate 16 and output artificial sunlight to the opposite ends of the light guide plate 16. Thus, a larger quantity of (brighter) artificial sunlight can be output from the radiation surface. However, the xenon light sources 9 and the halogen light sources 19 do not necessarily need to be provided at the opposite ends of the light guide plate 16, and may alternatively be provided at only one end of the light guide plate 16.

[Configuration of Xenon Light Sources 9 and Halogen Light Sources 19]

Figure 5:
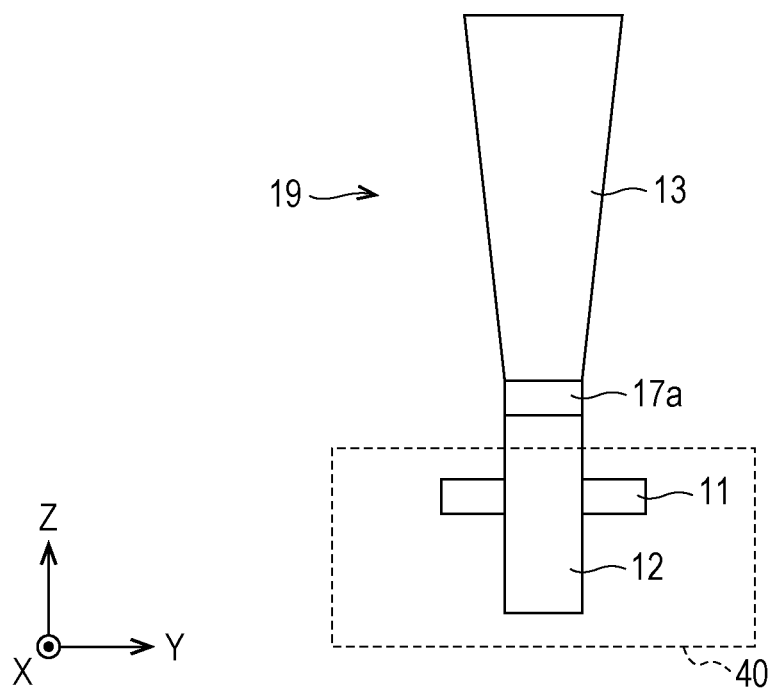
FIG. 5 illustrates a halogen light source according to the other embodiment of the present invention, as viewed from the radiation surface (upper surface) of the light guide plate.

Because the configuration of each xenon light source 9 is the same as that described in the first embodiment, a detailed description thereof will be omitted here. A detailed configuration of each halogen light source 19 will be described below with reference to FIG. 5. FIG. 5 illustrates the halogen light source 19, as viewed from the radiation surface (upper surface) of the light guide plate 16. As shown in FIG. 5, the halogen light source 19 is constituted of a halogen lamp 11, a condensing element 12 (optical member), a tapered coupler 13 (optical member), reflective plates 17a and 17b, and an optical filter 6.

The halogen lamp 11 preferably has a tubular shape for causing light to efficiently enter the light guide plate 16. With the halogen lamp 11 having a tubular shape, since the halogen lamp has a circular cross-sectional shape in an XZ plane, as shown in FIG. 5, the light output from the halogen lamp 11 is output in all directions within the XZ plane. In order to cause the light output from the halogen lamp 11 to efficiently enter the light guide plate 16, the halogen lamp 11 is surrounded by the condensing element 12 except for the output direction toward the tapered coupler 13. Thus, of the light output from the halogen lamp 11, a light beam not traveling toward the tapered coupler 13 is reflected by the condensing element 12 so as to be output toward the tapered coupler 13. In other words, the condensing element 12 condenses and outputs the light output from the halogen lamp 11. The condensing element 12 is, for example, an ellipsoidal mirror or a parabolic mirror and aligns the radiation directivity of the light output from the halogen lamp 11. As a result, the light output directly from the halogen lamp 11 and the light reflected by the condensing element 12 are output toward the tapered coupler 13. Consequently, the light output from the halogen lamp 11 is utilized effectively.

The tapered coupler 13 is an optical element provided in the halogen light source 19. The tapered coupler 13 is provided between the halogen lamp 11 and the optical filter 6. One end of the tapered coupler 13 is disposed adjacent to the halogen lamp 11, whereas the other end is disposed adjacent to the optical filter 6. As shown in FIG. 5, the tapered coupler 13 has a pair of tapered surfaces facing each other when viewed from an X direction. Specifically, the cross-sectional area of the tapered coupler 13 gradually increases from the entrance surface to the exit surface of the tapered coupler 13. With this structure, the light output from the halogen lamp 11 is repeatedly reflected by the side surfaces of the tapered coupler 13, so that the directivity is improved. Thus, light with aligned directivity in a direction (Z direction) substantially vertical to the exit surface of the tapered coupler 13 is output from the exit surface of the tapered coupler 13. A dotted line denotes a lamp cover 40.

In order to make the spectrum distribution of the artificial sunlight analogous to the spectrum distribution of reference sunlight, the halogen light source 19 is equipped with the optical filter 6. The optical filter 6 is an optical element that adjusts the spectrum distribution (controls the transmittance) of the light output from the halogen lamp 11 (tapered coupler 13). The optical filter 6 is normally called an air mass filter (spectrum adjustment filter). The optical filter 6 is provided adjacent to the exit surface of the tapered coupler 13 corresponding to the halogen lamp 11. The optical filter 6 adjusts the spectrum distribution of halogen light output from the tapered coupler 13. Thus, of the halogen light output from the tapered coupler 13, a wavelength component that is not necessary for generating artificial sunlight can be removed.

Each of the optical filters 4 and 6 is formed by forming a multilayer optical film over a glass member so that light is transmitted therethrough with transmittance that matches that of reference sunlight. The advantage of aligning the directivity of light in the tapered couplers 3 and 13 is related to the structure of the optical filters 4 and 6. Therefore, the transmittance characteristics change as the incident angle on the optical filters 4 and 6 deviates by a larger amount than vertical incidence on the optical filters 4 and 6. In other words, when light with poor directivity enters the optical filters 4 and 6, artificial sunlight having spectrum distribution deviated from the spectrum distribution of reference sunlight is generated. However, by using the tapered couplers 3 and 13 to align the directivity of light, artificial sunlight with spectrum distribution analogous to that of reference sunlight can be generated.

In detail, light output from the tapered couplers 3 and 13 has an incident-angle range of ±30° or lower relative to the optical filters 4 and 6, respectively. Since the optical filters 4 and 6 are designed so that predetermined transmission characteristics can be obtained when light enters the optical filters 4 and 6 at an incident angle of 0°, that is, when light enters the optical filters 4 and 6 vertically thereto, a vertical phase shift (approximately 1-cos 30°) of the incident light on the optical filters 4 and 6 is 14% at maximum. Even when an incident-angle component increases from 0° to 30°, the phase shift is an average value of 0% to 14%, thereby reducing fluctuations in transmittance when light enters the optical filters 4 and 6 relative to a designed incident angle of 0°.

Accordingly, since light with high directivity enters the optical filters 4 and 6, spectrum controllability is enhanced, so that artificial sunlight that is more analogous to reference sunlight can be formed. As a result, light obtained after passing through the optical filters 4 and 6 is closer to designed light, that is, analogous to real sunlight, so that the spectral coincidence of the artificial sunlight can be made analogous to that of JIS MS-class light with a deviation within ±5% from reference sunlight.

Subsequently, the light output from the optical filters 4 and 6 enters the wavelength selecting members 5. Each wavelength selecting member 5 has a wavelength selecting function. Specifically, the wavelength selecting member 5 selects (extracts) light beams necessary for artificial sunlight from the light output from the xenon lamp 1 and the halogen lamp 11, and synthesizes artificial sunlight by mixing the selected light beams. In detail, the wavelength selecting member 5 reflects light with a wavelength shorter than a boundary wavelength (at the short wavelength side of the boundary wavelength (e.g., 650 nm)) and transmits light with a wavelength longer than or equal to the boundary wavelength (at the long wavelength side of the boundary wavelength). In other words, the wavelength selecting member 5 has a function of transmitting light at the long wavelength side that is necessary for artificial sunlight and reflecting light at the short wavelength side. Then, the wavelength selecting member 5 mixes the light at the long wavelength side and the light at the short wavelength side so as to synthesize artificial sunlight.

More specifically, the output light from the halogen lamp 11 contains a large quantity of long-wavelength-side component necessary for artificial sunlight. On the other hand, the output light from the xenon lamp 1 contains a large quantity of short-wavelength-side component necessary for artificial sunlight. In the wavelength selecting member 5, the boundary wavelength is set within a range of 600 nm to 800 nm, and the wavelength selecting member 5 reflects light with a wavelength shorter than this boundary wavelength and transmits light with a wavelength longer than or equal to the boundary wavelength. In other words, of the output light from the halogen lamp 11, only a light beam (long-wavelength-side light component) with a wavelength longer than or equal to the boundary wavelength is transmitted by the wavelength selecting member 5. On the other hand, of the output light from the xenon lamp 1, only a light beam (short-wavelength-side light component) with a wavelength shorter than the boundary wavelength is reflected by the wavelength selecting member 5.

For example, it is assumed that light with a wavelength of 650 nm or longer is used as the light from the halogen lamp 11, and the light from the xenon lamp 1 has a wavelength shorter than 650 nm. In this case, the boundary wavelength for reflection and transmission by the wavelength selecting member 5 is 650 nm. In other words, the wavelength selecting member 5 has properties in which it reflects light with a wavelength shorter than 650 nm and transmits light with a wavelength longer than or equal to 650 nm. Thus, only light beams with wavelengths necessary for artificial sunlight are selected by the wavelength selecting member 5. Then, the selected light beams are combined and output as artificial sunlight. The boundary wavelength used for determining whether light is to be reflected or transmitted by the wavelength selecting member 5 may be arbitrarily set. However, in order to reduce an emission-line component in the emission spectrum of the xenon lamp 1, it is preferable that the boundary wavelength be set in a range between 600 nm and 700 nm. Furthermore, a filter or a mirror having wavelength dependency may be used as each wavelength selecting member 5. For example, a cold mirror, a hot mirror, and so on may be used.

Accordingly, the wavelength selecting member 5 extracts a long-wavelength light component, necessary for synthesizing artificial sunlight, from the output light from the halogen lamp 11 and also extracts a short-wavelength light component, necessary for synthesizing artificial sunlight, from the output light from the xenon lamp 1 so as to generate artificial sunlight. In this case, a short-wavelength light component from the halogen lamp 11 that is not spectrally controlled is removed, and likewise, a long-wavelength light component from the xenon lamp 1 that is not spectrally controlled is removed. Therefore, the emission spectrum of the artificial sunlight can be made more analogous to the emission spectrum of the reference sunlight.

Although the light guide plate 16 is formed of a material with high transmittance, such as quartz, it is preferable that, for example, quartz glass that is as thin as possible be used since it is expensive. Thus, each optical coupling member 8 is preferably configured to reduce the width of the light passing through the tapered coupler 3 and the tapered coupler 13 to the thickness of the thin light guide plate 16.

[Radiation of Artificial Sunlight]

Figure 6:
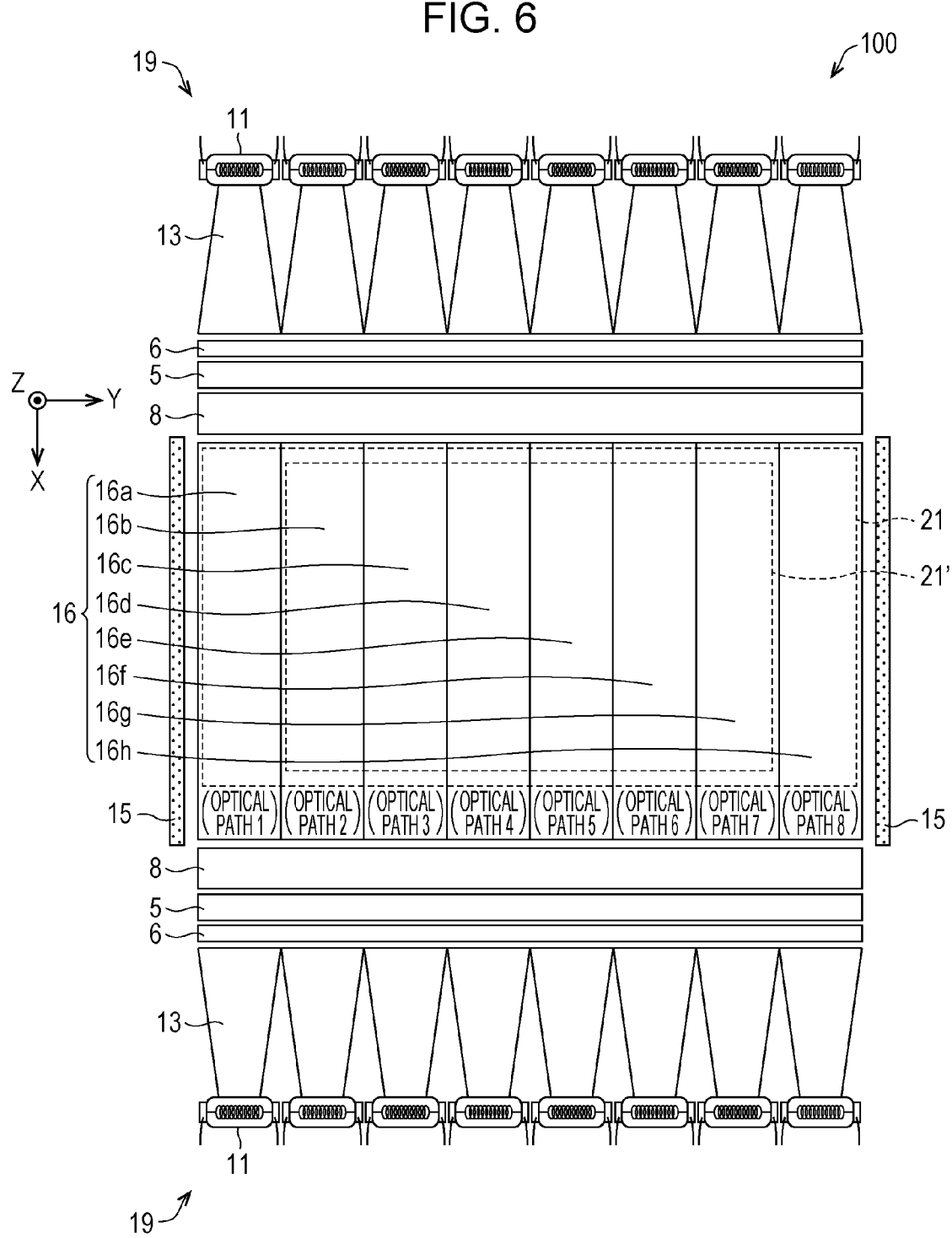
FIG. 6 is a top view illustrating a relevant configuration of the artificial sunlight radiation device according to the other embodiment of the present invention.

The radiation of artificial sunlight in the artificial sunlight radiation device 100 according to this embodiment will be described in further detail. FIG. 6 is a top view illustrating a relevant configuration of the artificial sunlight radiation device 100.

As shown in FIG. 6, since it is difficult to manufacture a long xenon lamp 1 and a long halogen lamp 11 at low cost, it is preferable that multiple xenon lamps 1 and multiple halogen lamps 11 be arranged in the artificial sunlight radiation device 100. In this case, the light guide plate 16 is divided into multiple (eight in FIG. 6) light guide members 16a to 16h in accordance with the number of xenon lamps 1 and halogen lamps 11. In other words, multiple (eight in FIG. 6) xenon light sources 9 and halogen light sources 19 are provided in correspondence with the light guide members 16a to 16h.

In the artificial sunlight radiation device 100, the light guide plate 16 is divided into multiple light guide members 16a to 16h so that the total quantity of input light can be increased for all of the light guide members 16a to 16h. Furthermore, arranging multiple small-sized light guide members rather than forming the light guide plate 16 with a single plate is advantageous in terms of cost for obtaining the light guide plate 16 of a desired size.

As described above, in FIG. 6, the light guide plate 16 is constituted of eight light guide members 16a to 16h arranged in a Y direction. The light guide members 16a to 16h receive light from the corresponding xenon light sources 9 and the corresponding halogen light sources 19 via the tapered couplers 3, the optical filters 4, and the optical coupling members 8. For a subsequent description, optical paths within the light guide members 16a to 16h will be defined as optical paths 1 to 8, respectively.

The light guide members 16b to 16g are located at the intermediate section of the eight arranged light guide members and each have other light guide members disposed adjacent to opposite sides thereof. In other words, the optical paths 2 to 7 each have other optical paths disposed adjacent to opposite sides thereof, whereas each of the optical path 1 and the optical path 8 does not have other optical paths disposed adjacent to opposite sides thereof. With regard to the optical path 1, only the optical path 2 is disposed at the Y-direction side (right side in the drawing) thereof. With regard to the optical path 8, only the optical path 7 is disposed at the opposite side (left side in the drawing) of the Y-direction side thereof.

Light entering each of the light guide members 16b to 16g passes through the optical path thereof and a portion of the light enters the adjacent light guide members. In other words, a portion of the light entering each of the light guide members 16b to 16g is guided in the longitudinal direction (X direction) of the light guide member while being mixed in the adjacent optical paths, and is directed upward toward the solar battery 20 disposed at the Z-direction side (radiation side of the artificial sunlight radiation device 10).

On the other hand, light entering the light guide member 16a passes through the optical path 1 and is directed upward from the light guide member 16a toward the solar battery 20 disposed at the Z-direction side (radiation side of the artificial sunlight radiation device 10) while being guided in the longitudinal direction (X direction) of the light guide member 16a. In addition, the light is mixed in the optical path 2 of the adjacent light guide member 16b so as to be directed upward also from the light guide member 16b. Likewise, with regard to the light guide member 16h, light entering the light guide member 16h passes through the optical path 8 and is directed upward from the light guide member 16h toward the solar battery 20 disposed at the Z-direction side (radiation side of the artificial sunlight radiation device 10) while being guided in the longitudinal direction (X direction) of the light guide member 16h. In addition, the light is mixed in the optical path 7 of the adjacent light guide member 16g so as to be directed upward also from the light guide member 16g.

Normally, a portion of the light entering the light guide member 16a is output toward the opposite side (left side in the drawing) of the Y-direction side of the light guide member 16a. Such light is output outward of a measurement region (region where the solar battery 20 is disposed) and cannot be utilized as measurement light, thus becoming a loss in terms of light utilization efficiency. Likewise, with regard to the light guide member 16h, a portion of the light entering the light guide member 16h is output toward the Y-direction side (right side in the drawing) of the light guide member 16h. Such light is output outward of the measurement region (region where the solar battery 20 is disposed) and cannot be utilized as measurement light, thus becoming a loss in terms of light utilization efficiency.

However, in this embodiment, the side-surface reflection members 15 are provided at the two side surfaces of the light guide plate 16 that are not provided with the xenon light sources 9 and the halogen light sources 19. Specifically, the side-surface reflection members 15 are provided at the opposite side (left side in the drawing) of the Y-direction side of the optical path 1 of the light guide member 16a and at the Y-direction side (right side in the drawing) of the optical path 8 of the light guide member 16h. The aforementioned light that is output outward of the measurement region from the optical path 1 of the light guide member 16a and the optical path 8 of the light guide member 16h and is to become a loss is reflected by the side-surface reflection members 15, returns to the optical path 1 and the optical path 8, and is directed upward toward the Z-direction side (radiation side of the artificial sunlight radiation device 20) from the optical path 1 and the optical path 8. As a result, the intensity of the light directed upward toward the Z-direction side (radiation side of the artificial sunlight radiation device 20) from each of the optical path 1 of the light guide member 16a and the optical path 8 of the light guide member 16h can be increased to about the same level as the intensity of the light directed upward toward the Z-direction side (radiation side of the artificial sunlight radiation device 20) from each of the optical paths 2 to 7 of the light guide members 16b to 16g. Consequently, in contrast to the measurement region (region where the solar battery 20 is disposed) where uniform light intensity can be stably obtained being a dotted-line section 21' shown in the drawing in a case where the light guide plate 16 is not provided with the side-surface reflection members 15, the measurement region where such uniform light intensity can be stably obtained can be expanded to a dotted-line section 21 shown in the drawing.

Furthermore, in the configuration in which multiple light guide members are arranged as in this embodiment, illuminance adjustment of each light guide member can be performed independently, which is ultimately advantageous in that the illuminance of the entire radiation surface is adjustable. In the configuration in which multiple light guide members are arranged, since an optical loss occurs multiple times as the light passes through the interfaces between adjacent light guide members, the quantity of radiation light at the entire radiation surface slightly decreases. In particular, a decrease in the quantity of radiation light in the optical paths of the light guide members disposed at the ends is of concern. However, since the side-surface reflection members 15 are disposed along the opposite end surfaces of the light guide plate 16 in this embodiment, a decrease in illuminance in the optical paths of the light guide members at the opposite ends can be suppressed, whereby uniform illuminance can be achieved.

The present invention is not limited to the above-described embodiments, and various modifications are permissible within the scope defined in the claims. Specifically, an embodiment obtained by combining technical means appropriately modified within the scope defined in the claims is also included in the technical scope of the invention.

[Outline of Embodiments]

Accordingly, the artificial sunlight radiation device according to the present invention is characterized in that the aforementioned light guide plate is constituted of multiple light guide members.

According to the above-described configuration, illuminance adjustment of each light guide member can be performed independently, which is ultimately advantageous in that the illuminance of the entire radiation surface is adjustable. In the configuration in which multiple light guide members are arranged, since an optical loss occurs multiple times as the light passes through the interfaces between adjacent light guide members, the quantity of radiation light at the entire radiation surface slightly decreases. In particular, a decrease in the quantity of radiation light in the optical paths of the light guide members disposed at the ends is of concern. However, since the side-surface reflection members are disposed along the opposite end surfaces of the light guide plate in the present invention, a decrease in illuminance in the optical paths of the light guide members at the opposite ends can be suppressed, whereby uniform illuminance can be achieved.

Furthermore, the artificial sunlight radiation device according to the present invention is characterized in that each side-surface reflection member is formed of a plate-like member.

With the above-described configuration, an increase in size of the device as well as an increase in costs of the components can be prevented.

Furthermore, the artificial sunlight radiation device according to the present invention is characterized in that the height of each side-surface reflection member in the thickness direction of the light guide plate is adjustable.

With the above-described configuration, the height of each side-surface reflection member in the thickness direction of the light guide plate is adjusted such that the height may be variably adjusted to increase or finely adjust an effective measurement region.

Furthermore, the artificial sunlight radiation device according to the present invention is characterized in that it further includes a housing in which the device is stored. Moreover, each side-surface reflection member is formed by applying or bonding a reflective material to a part of an inner wall surface of the housing.

With the above-described configuration, the side-surface reflection members can each be provided with a simple configuration achieved by applying or bonding the reflective material to a part of the inner wall surface of the housing in which the device is stored.

Furthermore, the artificial sunlight radiation device according to the present invention is characterized in that the first light source is a xenon light source that radiates xenon light, which is the first light, and the second light source is a halogen light source that radiates halogen light, which is the second light.

With the above-described configuration, artificial light having an emission spectrum that is very analogous to an emission spectrum of natural light (sunlight) can be radiated.

EXAMPLES

Although the present invention will be described below in further detail with reference to examples, the present invention is not limited to these examples so long as they do not depart from the spirit of the invention.

Example 1

Figure 7:
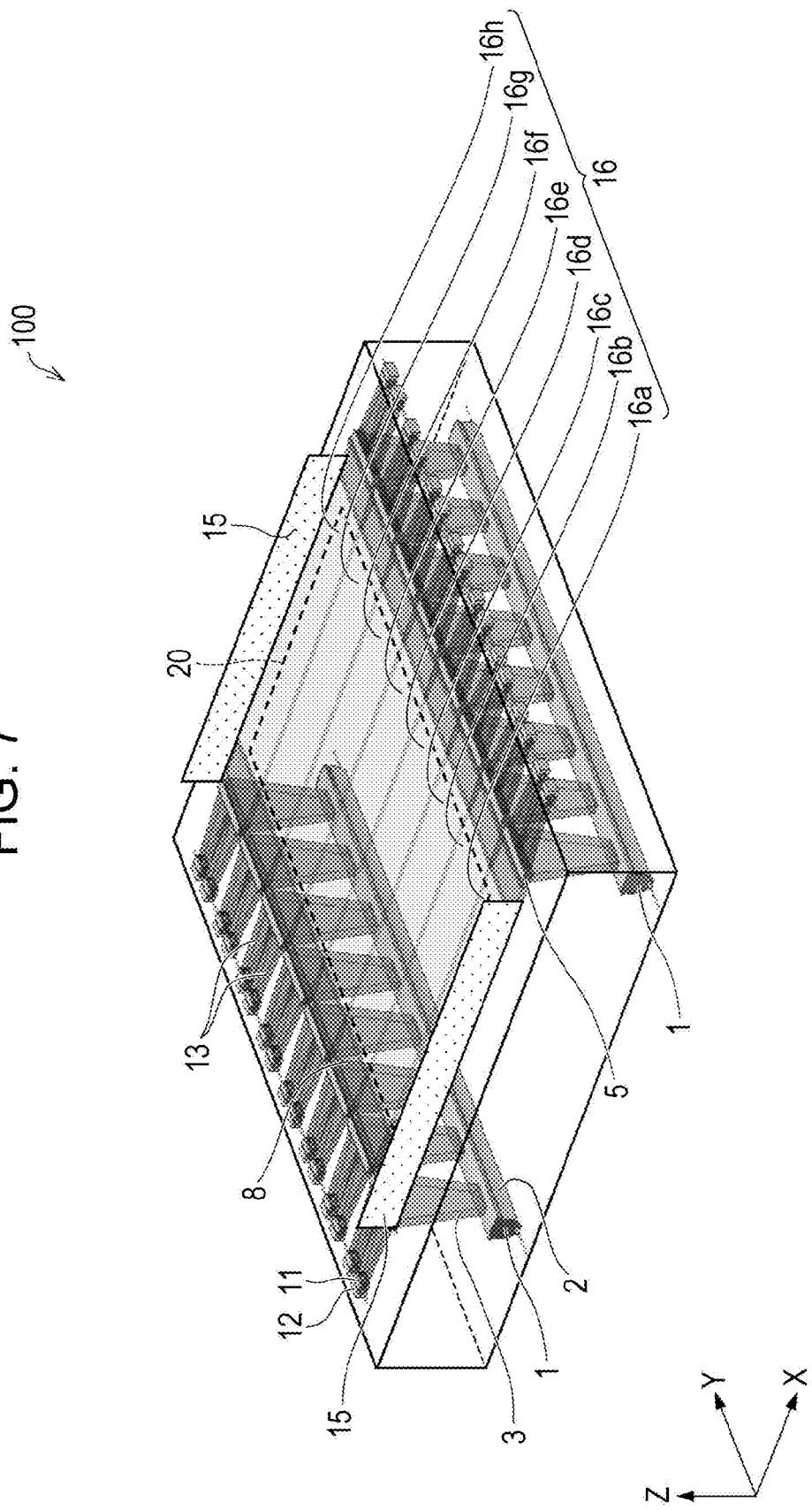
FIG. 7 is a perspective view illustrating an artificial sunlight radiation device according to an example of the present invention.
Figure 8:
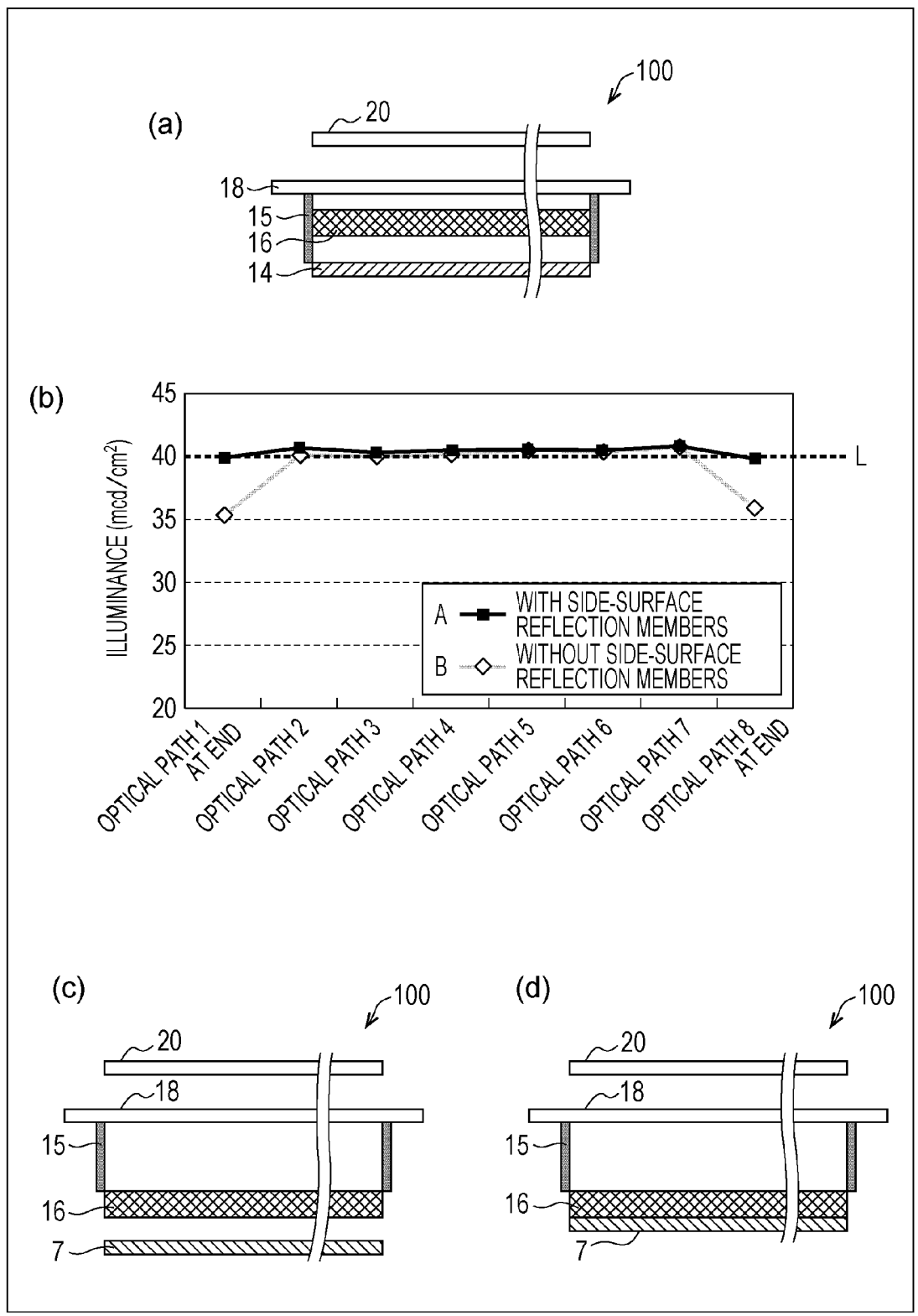
FIG. 8 includes a cross-sectional view (a) of the artificial sunlight radiation device according to the example of the present invention, a diagram (b) illustrating the illuminance in each optical path of the light guide plate according to the example of the present invention, a diagram (c) illustrating a modification of the present invention in which side-surface reflection members are disposed toward a solar battery (irradiated member) side relative to opposite end surfaces of the light guide plate, and a diagram (d) illustrating another modification of the present invention in which a reflective plate is disposed adjacent to a lower surface of the light guide plate, which is opposite the radiation surface thereof.

An example obtained by partly modifying the artificial sunlight radiation device 100 according to the second embodiment of the present invention will be described with reference to FIGS. 7 and 8. FIG. 7 is a perspective view illustrating the artificial sunlight radiation device 100 according to this example. FIG. 8(a) is a cross-sectional view of the artificial sunlight radiation device 100 according to this example, and FIG. 8(b) illustrates the illuminance in each optical path of the light guide plate 16.

As shown in FIG. 7, in this example, the artificial sunlight radiation device 100 according to the second embodiment equipped with the xenon light sources 9 and the halogen light sources 19 is used. The width, in the Y direction, of the exit ends of the tapered couplers 13 in the halogen light sources 19 and the width, in the Y direction, of each of the light guide members 16a to 16h are set to 225 mm, so that the eight arranged members constitute a 1800-mm measurement region. The length of each of the light guide members 16a to 16h in the X direction is 1000 mm.

With regard to the halogen light sources 19, two tapered couplers 13 are provided for each of the light guide members 16a to 16h, and the halogen light sources 19 are provided in correspondence with these tapered couplers 13. This is because it is difficult to form a halogen lamp 11 by using a lamp with a long filament length. Thus, two halogen lamps 11 with a short filament length, which are easy to form, are arranged. The width, in the Y direction, of the exit end of the tapered coupler 13 corresponding to each halogen light source 19 is set to 112.5 mm. By arranging two halogen light sources 19, the width thereof corresponds to the 225-mm width, in the Y direction, of each of the light guide members 16a to 16h. Consequently, by arranging the multiple light guide members 16a to 16h, a light guide plate 16 that is large in size in appearance is formed.

In the artificial sunlight radiation device 100 according to this example, opposite side surfaces of the light guide plate 16 are provided with side-surface reflection members 15. In detail, as shown in FIG. 8(a), with regard to the light guide member 16a, a side-surface reflection member 15 is provided at the right side (opposite side of the Y-direction side in FIG. 7) thereof. With regard to the light guide member 16h, a side-surface reflection member 15 is provided at the left side (Y-direction side in FIG. 7) thereof. As shown in FIG. 8(a), a transparent protection plate 18 that protects the light guide plate 16 from scratches, dust, and the like is disposed at the upper side (radiation side) of the light guide plate 16, where necessary. The side-surface reflection members 15 are provided between a position directly above the reflection member 14 and a position directly below the protection plate 18. In FIG. 7, the protection plate 18 is not illustrated so as to simplify the drawing.

The illuminance obtained when the side-surface reflection members 15 are disposed and the illuminance obtained when the side-surface reflection members 15 are not disposed are compared by using the artificial sunlight radiation device 100 according to this example. Reference character A in FIG. 8(b) denotes illuminance data in the optical paths 1 to 8 when the side-surface reflection members 15 are installed, and reference character B denotes illuminance data in the optical paths 1 to 8 when the side-surface reflection members 15 are not installed. The measurement location is at an intermediate section of each of the light guide members 16a to 16h in the X direction.

In the illuminance data A corresponding to the case where the side-surface reflection members 15 are installed, light is radiated with a specified illuminance L (required illuminance level, which is provisionally set to 40 mcd/cm$^2$) uniformly onto the optical paths 1 to 8. On the other hand, the illuminance data B corresponding to the case where the side-surface reflection members 15 are not installed exhibits a so-called trapezoidal light intensity profile in which the illuminance at the optical paths located at the ends, such as the optical path 1 and the optical path 8, is weak. It is clear from this that the intensity of the light directed upward toward the Z-direction side (radiation side of the artificial sunlight radiation device 20) from each of the optical path 1 of the light guide member 16a and the optical path 8 of the light guide member 16h can be increased to about the same level as the intensity of the light directed upward toward the Z-direction side (radiation side of the artificial sunlight radiation device 20) from each of the optical paths 2 to 7 of the light guide members 16b to 16g. Consequently, the measurement region where uniform light intensity can be stably obtained can be expanded to the dotted-line section 21 shown in the drawing, as compared with the case where the light guide plate 16 is not provided with the side-surface reflection members 15.

As an alternative to disposing the side-surface reflection members 15 at the opposite end surfaces of the light guide plate 16, that is, at the side surfaces thereof that are parallel to the thickness direction of the light guide plate 16, the side-surface reflection members 15 may be disposed toward the solar battery 20 (irradiated member) side relative to the opposite end surfaces of the light guide plate 16. In other words, the side-surface reflection members 15 may be disposed between the protection plate 18 and the light guide plate 16.

For example, FIG. 8(c) illustrates a modification in which the side-surface reflection members 15 are disposed toward the solar battery 20 (irradiated member) side relative to the opposite end surfaces of the light guide plate 16. With this modification, the side-surface reflection members 15 are formed only at the solar battery 20 (irradiated member) side of the light guide plate 16 so that the light directivity is less likely to change, whereby artificial sunlight radiation that puts a high priority on directivity can be performed.

For example, in the case where the side-surface reflection members 15 are disposed at the opposite end surfaces of the light guide plate 16, light with poor radiation directivity that is radiated toward a reflective plate 7 (reflection member 14) of the light guide plate 16 and is reflected by the reflective plate 7 (e.g., light with an incident angle θ of 30° or lower on the opposite end surfaces of the light guide plate 16) is reflected and returned by the side-surface reflection members 15 and becomes mixed with the light used for the measurement at the radiation surface. Therefore, although the quantity of reflected light may increase, the radiation directivity tends to ultimately decrease.

In contrast, with the modification shown in FIG. 8(c), the light with poor directivity leaks outward from the opposite end surfaces of the light guide plate 16 without being reflected by the side-surface reflection members 15. Therefore, only light with good directivity becomes reflected toward the radiation surface. Thus, the light to be used for the measurement has high directivity.

FIG. 8(d) illustrates a modification in which the reflective plate 7 is disposed adjacent to the lower surface of the light guide plate 16, which is opposite the radiation surface thereof. In this modification, because the light guide plate 16 and the reflective plate 7 are disposed adjacent to each other, even if the side-surface reflection members 15 are disposed at the solar battery 20 (irradiated member) side relative to the opposite end surfaces of the light guide plate 16, the quantity of light exiting the light guide plate 16 without being reflected can be reduced due to the absence of the side-surface reflection members 15 at the opposite end surfaces of the light guide plate 16. In other words, the percentage of light entering the opposite end surfaces of the light guide plate 16 is reduced so that the quantity of light traveling directly toward the upper surface of the light guide plate 16 at the solar battery 20 (irradiated member) side can be increased.

With regard to the side-surface reflection members 15, metal plates of, for example, aluminum, with which high reflectivity can be obtained with a wavelength ranging between 350 nm and 1100 nm can be used, or resin plates plated with thin metallic films can be used. Alternatively, the side-surface reflection members 15 may each have a simple configuration. For example, each side-surface reflection member 15 may be formed of a resin plate on which, for example, protrusions and recesses that exhibit a reflecting function are printed or molded. As another alternative, each side-surface reflection member 15 may be formed of a reflective material, such as an aluminum foil, bonded to the inside of the housing in which the artificial sunlight radiation device 10 is stored. As a further alternative, each side-surface reflection member 15 may be formed by applying a metal-containing coating to the inside of the housing.

Example 2

Figure 9:
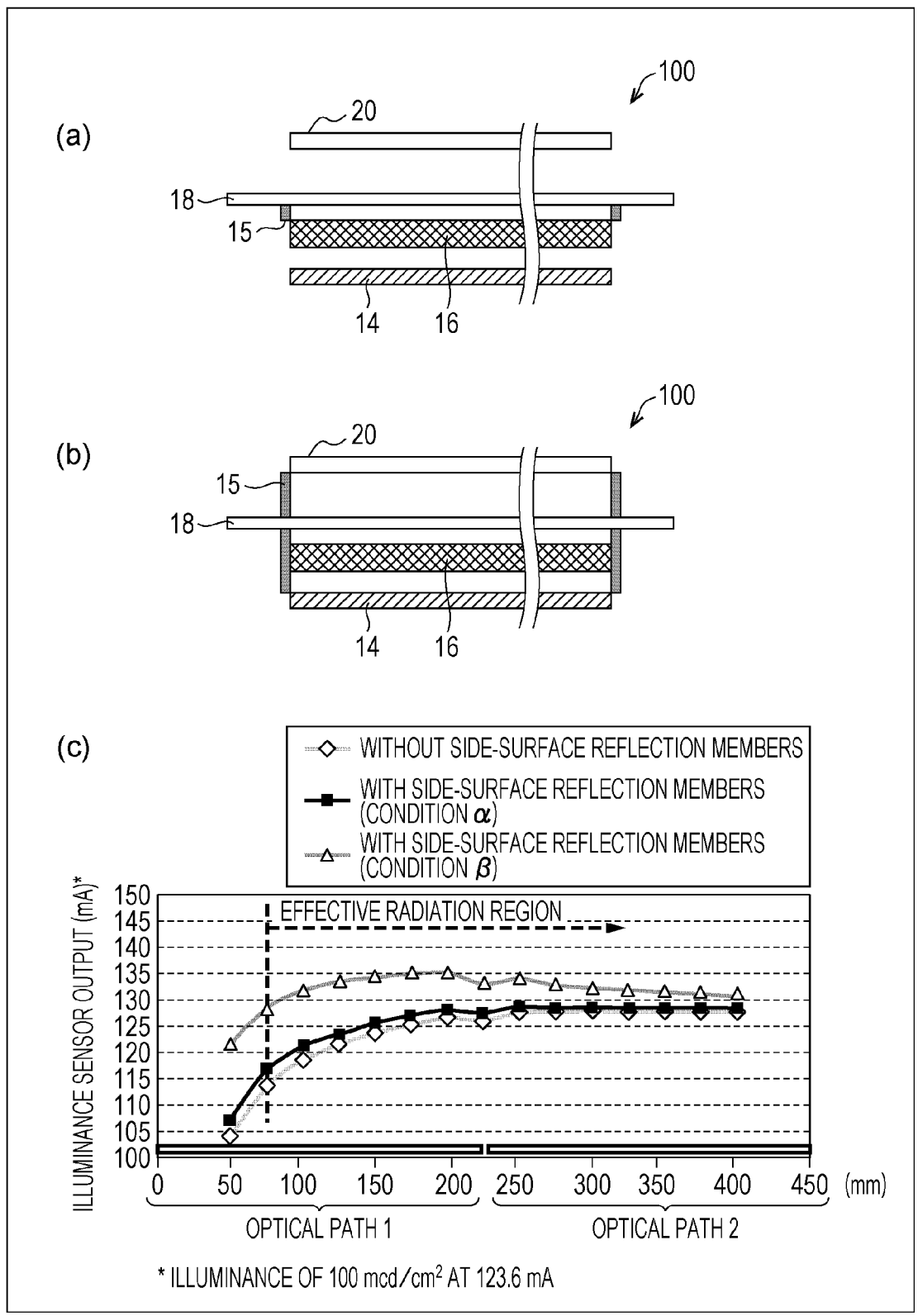
FIG. 9 includes cross-sectional views (a) and (b) of an artificial sunlight radiation device used in another example of the present invention, and a diagram (c) illustrating the illuminance in each optical path of the light guide plate used in the other example of the present invention.

In this example, a comparison process is performed on illuminance data obtained by using a device obtained by partly modifying the artificial sunlight radiation device 100 according to Example 1. FIGS. 9(a) and 9(b) are cross-sectional views of the artificial sunlight radiation device 100 used in this example, and FIG. 9(c) illustrates an illuminance sensor output in each optical path of the light guide plate 16. The illuminance sensor output is set to 100 mcd/cm$^2$ at 123.6 mA.

In this example, an illuminance-data comparison process is performed by using two kinds of artificial sunlight radiation devices 100 provided with the side-surface reflection members 15 and an artificial sunlight radiation device not provided with the side-surface reflection members 15. As shown in FIG. 9(a), one of the two kinds of artificial sunlight radiation devices 100 is provided with the side-surface reflection members 15 only in a 20-mm gap region between the light guide plate 16 and the protection plate 18 (condition α). As shown in FIG. 9(b), the other artificial sunlight radiation device is provided with the side-surface reflection members 15 that extend from a position directly below the light guide plate 16 to a height of 30 mm above the protection plate 18 (condition β).

In FIG. 9(c), "without side-surface reflection member" corresponds to illuminance data in a case where the side-surface reflection members 15 are not provided, "with side-surface reflection members (condition α)" corresponds to illuminance data in a case where the side-surface reflection members 15 shown in FIG. 9(a) are provided, and "with side-surface reflection members (condition β)" corresponds to illuminance data in a case where the side-surface reflection members 15 shown in FIG. 9(b) are provided.

It is clear from this that, in the illuminance data corresponding to the case (condition α) where the side-surface reflection members 15 are installed only in the 20-mm gap region between the light guide plate 16 and the protection plate 18, there is a slight increase in illuminance as compared with the case where the side-surface reflection members 15 are not provided. On the other hand, in the illuminance data corresponding to the case (condition β) where the installed side-surface reflection members 15 extend from the position directly below the light guide plate 16 to the height of 30 mm above the protection plate 18, there is a large increase in illuminance as compared with the case where the side-surface reflection members 15 are not provided. In particular, there is a large increase in illuminance in the optical path 1, and an illuminance variation between the optical path 1 and the optical path 2 is reduced.

Assuming that an effective measurement region (effective radiation region) is set at a position located 75 mm from an end of the optical path 1 of the light guide member 16a, an illuminance variation measured based on the illuminance sensor outputs of the optical path 1 and the optical path 2 is minimized to 3.8%.

Figure 10:
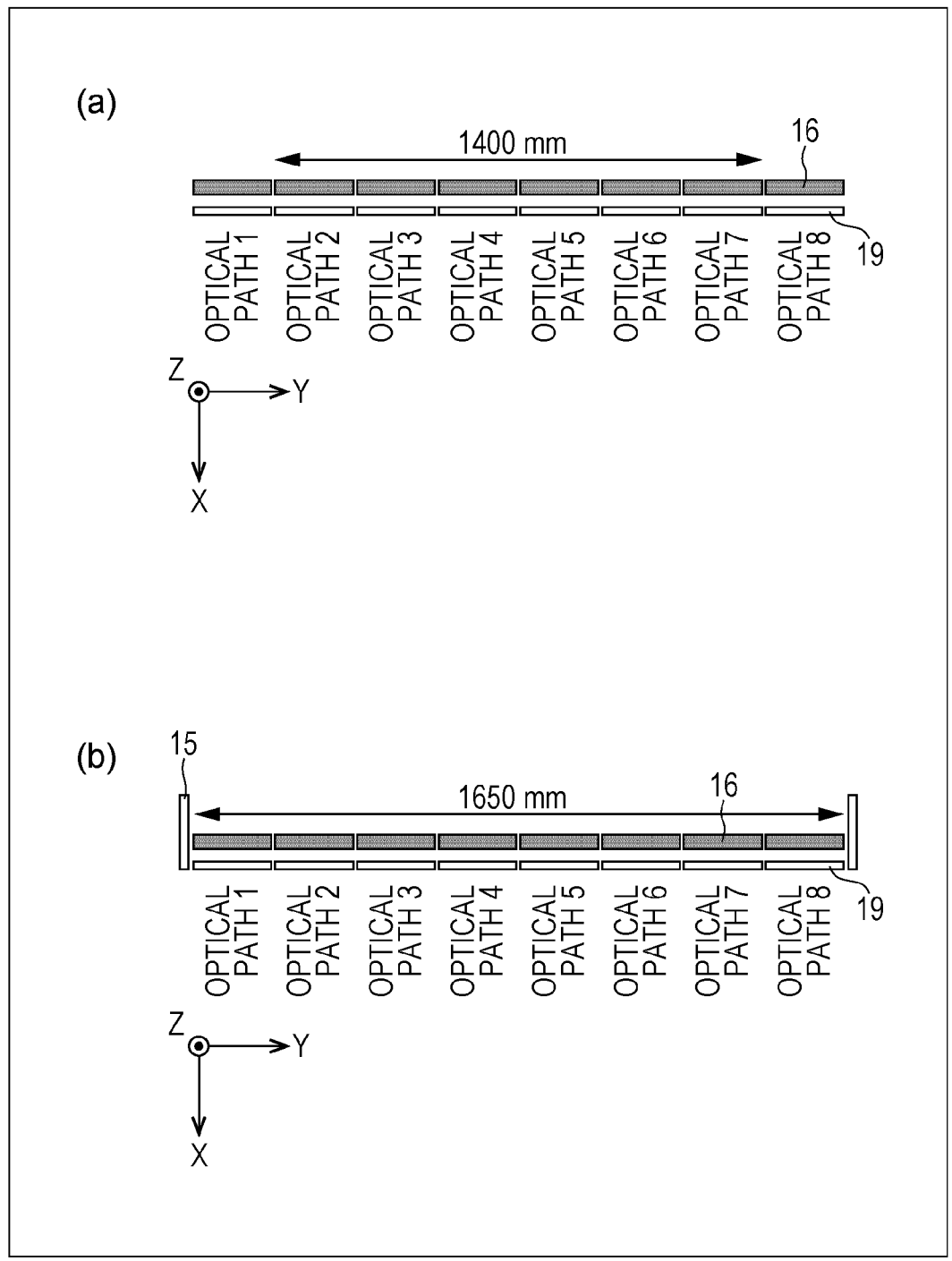
FIG. 10 schematically illustrates an image of the light guide plate and light sources corresponding thereto, and includes a diagram (a) corresponding to a case where the side-surface reflection members are not used and a diagram (b) corresponding to a case where the side-surface reflection members are used.

As indicated by this data, the radiation range can be changed by changing the height of the side-surface reflection members 15. The configuration in this example is advantageous in that the radiation range can be expanded by changing the height and the position of the side-surface reflection members by using a side-surface-reflection-member adjusting mechanism. A difference in measurement regions of the solar battery 20 serving as an irradiated member between when the side-surface reflection members 15 are provided and when the side-surface reflection members 15 are not provided will be schematically described with reference to FIG. 10. FIG. 10 schematically illustrates an image of the light guide plate 16 and light sources corresponding thereto, and includes a diagram (a) corresponding to the case where the side-surface reflection members 15 are not used and a diagram (b) corresponding to the case where the side-surface reflection members 15 are used.

In the case of FIG. 10(a), the upper portions of the optical path 1 and the optical path 8 of the light guide members at the opposite ends do not serve as an effective measurement region, and only the upper portions of the optical paths 2 to 7 of the six intermediate light guide members act as an effective measurement region. Therefore, the width of the solar battery 20 in the Y direction within which the measurement is possible is 1400 mm.

On the other hand, in the case of FIG. 10(b), when the side-surface reflection members 15 are used, the upper portions of the optical path 1 and the optical path 8 of the light guide members at the opposite ends also serve as an effective measurement region except for parts of the ends thereof, so that the width of the solar battery 20 in the Y direction within which the measurement is possible is 1650 mm. In a solar simulator according to Patent Literature 1 described above, a method of radiating light from xenon lamps directly onto an irradiated member is employed instead of a method using light guide members. Thus, a so-called trapezoidal light intensity profile in which the light intensity at the upper portions of the two intermediate xenon lamps is high and uniform but the light intensity at the upper portions of the xenon lamps decreases toward the ends is exhibited. Consequently, the reason why the upper portions of all lamps do not serve as an effective measurement region is obvious.

The specific embodiments and examples in the detailed description of the invention are only intended to clarify the technical contents of the present invention and should not be narrowly interpreted to limit the invention to such detailed examples. Various modifications are permissible within the spirit of the invention and the scope of the following claims.

Industrial Applicability

The present invention can be utilized for inspecting, measuring, and testing solar batteries. Furthermore, the present invention can also be utilized for performing discoloration and fading tests on cosmetics, coatings, adhesives, and various kinds of materials. Moreover, the present invention can be utilized for inspecting and testing photo-catalysts and also for performing other various kinds of tests that require natural light.

REFERENCE SIGNS LIST 1 xenon lamp
2, 12 condensing element
3, 13 tapered coupler
4, 6 optical filter
5 wavelength selecting member
7a, 7b, 17a, 17b reflective plate
8 optical coupling member
9 xenon light source
10, 100 artificial sunlight radiation device
11 halogen lamp
16 light guide plate
16a to 16h light guide member
17 light extracting member
18 protection plate
19 halogen light source
20 solar battery
120 measurement unit

The invention claimed is:

1. An artificial sunlight radiation device comprising:
a light source;
an optical member that gives directivity to output light from the light source;
an optical filter that adjusts an emission spectrum of the output light given the directivity;
a light guide plate that receives the output light whose emission spectrum has been adjusted;
a light extracting member that is provided at the light guide plate and extracts the output light entering the light guide plate to a radiation surface; and
a side-surface reflection member provided at one or more side end surfaces of the light guide plate; wherein
the light guide plate includes a plurality of light guide members; and
side-emitted light, which is output from at least one of the plurality of light guide members located at the one or more side end surfaces at which the side-surface reflection member is provided, is reflected by the side-surface reflection member toward an interior of the at least one of the plurality of light guide members and then radiated from the at least one of the plurality of light guide members to the radiation surface.

2. The artificial sunlight radiation device according to claim 1, wherein the side-surface reflection member is formed of a plate-like member.

3. The artificial sunlight radiation device according to claim 1, wherein the side-surface reflection member is adjustable in height in a thickness direction of the light guide plate.

4. The artificial sunlight radiation device according to claim 1, further comprising a housing in which the device is stored,
wherein the side-surface reflection member is formed by applying or bonding a reflective material to a part of an inner wall surface of the housing.

5. An artificial sunlight radiation device comprising:
a first light source that radiates first light;
a first optical member that gives directivity to the first light;
a first optical filter that adjusts an emission spectrum of the first light given the directivity;
a second light source that radiates second light that is different from the first light;
a second optical member that gives directivity to the second light;
a second optical filter that adjusts an emission spectrum of the second light given the directivity;
a wavelength selecting member that selects light with a shorter wavelength than a predetermined boundary wavelength from the first light whose emission spectrum has been adjusted, selects light with a longer wavelength than the predetermined boundary wavelength from the second light whose emission spectrum has been adjusted, and outputs the selected first light and the selected second light;
a light guide plate that receives the first light and the second light selected by the wavelength selecting member;
light extracting means that is provided at the light guide plate and extracts the first light and the second light entering the light guide plate to a radiation surface; and
a side-surface reflection member provided at one or more side end surfaces of the light guide plate; wherein
the light guide plate includes a plurality of light guide members; and
side-emitted light, which is output from at least one of the plurality of light guide members located at the one or more side end surfaces at which the side-surface reflection member is provided, is reflected by the side-surface reflection member toward an interior of the at least one of the plurality of light guide members and then radiated from the at least one of the plurality of light guide members to the radiation surface.

6. The artificial sunlight radiation device according to claim 5, wherein the first light source is a xenon light source that radiates xenon light as the first light, and
wherein the second light source is a halogen light source that radiates halogen light as the second light.

7. An artificial sunlight radiation device comprising:
a light source;
an optical member that gives directivity to output light from the light source;
an optical filter that adjusts an emission spectrum of the output light given the directivity;
a light guide plate that receives the output light whose emission spectrum has been adjusted;
a light extracting member that is provided at the light guide plate and extracts the output light entering the light guide plate to a radiation surface; and
a side-surface reflection member that is provided at one or more side end surfaces of the light guide plate, reflects a portion of the light output from the light guide plate, and directs the portion of the light toward the radiation surface; wherein
the light guide plate includes a plurality of light guide members; and
side-emitted light, which is output from at least one of the plurality of light guide members located at the one or more side end surfaces at which the side-surface reflection member is provided, is reflected by the side-surface reflection member toward an interior of the at least one of the plurality of light guide members and then radiated from the at least one of the plurality of light guide members to the radiation surface.

8. An artificial sunlight radiation device comprising:
a first light source that radiates first light;
a first optical member that gives directivity to the first light;
a first optical filter that adjusts an emission spectrum of the first light given the directivity;
a second light source that radiates second light that is different from the first light;
a second optical member that gives directivity to the second light;
a second optical filter that adjusts an emission spectrum of the second light given the directivity;
a wavelength selecting member that selects light with a shorter wavelength than a predetermined boundary wavelength from the first light whose emission spectrum has been adjusted, selects light with a longer wavelength than the predetermined boundary wavelength from the second light whose emission spectrum has been adjusted, and outputs the selected first light and the selected second light;
a light guide plate that receives the first light and the second light selected by the wavelength selecting member;
light extracting means that is provided at the light guide plate and extracts the first light and the second light entering the light guide plate to a radiation surface; and
a side-surface reflection member that is provided at one or more side end surfaces of the light guide plate, reflects a portion of the light output from the light guide plate, and directs the portion of the light toward the radiation surface; wherein
the light guide plate includes a plurality of light guide members; and
side-emitted light, which is output from at least one of the plurality of light guide members located at the one or more side end surfaces at which the side-surface reflection member is provided, is reflected by the side-surface reflection member toward an interior of the at least one of the plurality of light guide members and then radiated from the at least one of the plurality of light guide members to the radiation surface.

* * * * *